(12) United States Patent
Abramov et al.

(10) Patent No.: US 9,938,180 B2
(45) Date of Patent: Apr. 10, 2018

(54) METHODS OF CUTTING GLASS USING A LASER

(71) Applicant: Corning Incorporated, Corning, NY (US)

(72) Inventors: Anatoli Anatolyevich Abramov, Painted Post, NY (US); Naiyue Zhou, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 91 days.

(21) Appl. No.: 13/836,717

(22) Filed: Mar. 15, 2013

(65) Prior Publication Data

US 2013/0323469 A1 Dec. 5, 2013

Related U.S. Application Data

(60) Provisional application No. 61/655,690, filed on Jun. 5, 2012.

(51) Int. Cl.
*C03B 33/02* (2006.01)
*B23K 26/00* (2014.01)
(Continued)

(52) U.S. Cl.
CPC ...... *C03B 33/0222* (2013.01); *B23K 26/0006* (2013.01); *B23K 26/0057* (2013.01);
(Continued)

(58) Field of Classification Search
CPC . C03B 33/091; C03B 33/0222; C03B 33/023; C03B 33/072; C03B 33/09;
(Continued)

(56) References Cited

U.S. PATENT DOCUMENTS 2,959,507 A  11/1960 Long
3,453,097 A   7/1969 Hafner
(Continued)

FOREIGN PATENT DOCUMENTS

CN     1572452 A    2/2005
CN   101597135     12/2009
(Continued)

OTHER PUBLICATIONS

Karube, et al. "Laser-Induced Cleavage of LCD Glass as Full-Body Cutting"; Proceeding of SPIE, vol. 6880; pp. 688007-1 to 688007-10; 2008.
(Continued)

*Primary Examiner* — Jodi C Franklin
(74) *Attorney, Agent, or Firm* — John T. Haran

(57) ABSTRACT

A method of cutting a glass article includes translating a laser beam relative to a first surface of the glass article. The laser beam includes a beam waist having a center. The center of the beam waist of the laser beam is positioned at or below a second surface of the glass article. The laser beam creates a plurality of defects along a score line in the glass article such that the plurality of defects extends a distance into the glass article, and at least some individual defects of the plurality of defects are non-orthogonal to the first surface of the glass article and are biased in a direction of translation of the laser beam. Glass articles having edge defects are also disclosed.

12 Claims, 9 Drawing Sheets

(51) Int. Cl.
*B23K 26/364* (2014.01)
*B23K 26/53* (2014.01)
*B23K 26/57* (2014.01)
*B23K 26/08* (2014.01)
*B23K 103/00* (2006.01)

(52) U.S. Cl.
CPC ...... *B23K 26/0063* (2013.01); *B23K 26/0087* (2013.01); *B23K 26/0869* (2013.01); *B23K 26/364* (2015.10); *B23K 26/53* (2015.10); *B23K 26/57* (2015.10); *B23K 2203/54* (2015.10); *B65G 2249/04* (2013.01); *Y10T 428/24471* (2015.01)

(58) Field of Classification Search
CPC ............ B23K 2203/50; B23K 26/0057; B23K 26/40; B23K 26/0087; B23K 26/0624; B23K 26/364; B23K 26/0063; H01L 21/268; H01L 21/78; H01L 21/304; H01L 2924/40501; H01L 2924/40502
USPC .................. 65/112, 30.1–30.14, 97
See application file for complete search history.

(56) References Cited

U.S. PATENT DOCUMENTS

| | | | |
|---|---|---|---|
| 3,543,979 A | 12/1970 | Grove et al. | |
| 3,629,545 A | 12/1971 | Graham et al. | |
| 3,629,546 A | 12/1971 | Fry | |
| 3,751,238 A | 8/1973 | Grego et al. | |
| 3,935,419 A * | 1/1976 | Lambert et al. | 219/121.67 |
| 4,403,134 A | 9/1983 | Klingel | |
| 4,467,168 A | 8/1984 | Morgan et al. | |
| 4,468,534 A | 8/1984 | Boddicker | |
| 4,639,572 A | 1/1987 | Gruzman et al. | |
| 4,702,042 A | 10/1987 | Herrington et al. | |
| 5,084,604 A | 1/1992 | Dekker et al. | |
| 5,132,505 A | 7/1992 | Zonneveld et al. | |
| 5,609,284 A | 3/1997 | Kondratenko | |
| 5,776,220 A | 7/1998 | Allaire et al. | |
| 5,783,289 A | 7/1998 | Suzuki et al. | |
| 5,826,772 A | 10/1998 | Ariglio et al. | |
| 5,961,852 A | 10/1999 | Rafla-Yaun et al. | |
| 5,984,159 A | 11/1999 | Ostendarp et al. | |
| 6,023,039 A | 2/2000 | Sawada | |
| 6,112,967 A | 9/2000 | Ostendarp et al. | |
| 6,211,488 B1 | 4/2001 | Hoekstra et al. | |
| 6,222,604 B1 | 4/2001 | Suginoya et al. | |
| 6,252,197 B1 | 6/2001 | Hoekstra et al. | |
| 6,259,058 B1 | 7/2001 | Hoekstra | |
| 6,322,958 B1 * | 11/2001 | Hayashi | 430/495.1 |
| 6,327,875 B1 | 12/2001 | Allaire et al. | |
| 6,420,678 B1 | 7/2002 | Hoekstra | |
| 6,423,930 B1 | 7/2002 | Matsumoto | |
| 6,489,588 B1 | 12/2002 | Hoekstra et al. | |
| 6,590,181 B2 | 7/2003 | Choo et al. | |
| 6,676,878 B2 | 1/2004 | O'Brien et al. | |
| 6,684,885 B2 | 2/2004 | Graczyk | |
| 6,723,952 B2 | 4/2004 | Choo et al. | |
| 6,734,391 B2 | 5/2004 | Jeon | |
| 6,744,009 B1 * | 6/2004 | Xuan et al. | 219/121.67 |
| 6,787,732 B1 * | 9/2004 | Xuan et al. | 219/121.67 |
| 6,800,831 B1 | 10/2004 | Hoetzel | |
| 6,811,069 B2 | 11/2004 | Hauer et al. | |
| 6,870,129 B2 | 3/2005 | Hauer et al. | |
| 6,894,249 B1 | 5/2005 | Hauer et al. | |
| 6,919,530 B2 | 7/2005 | Borgeson et al. | 219/121.68 |
| 6,992,026 B2 | 1/2006 | Fukuyo et al. | 438/797 |
| 7,014,082 B2 | 3/2006 | Hauer et al. | |
| 7,211,526 B2 | 5/2007 | Iri et al. | |
| 7,217,448 B2 | 5/2007 | Koyo et al. | 428/131 |
| 7,304,265 B2 | 12/2007 | Otsu et al. | |
| 7,371,431 B2 | 5/2008 | Dietz et al. | |
| 7,396,742 B2 | 7/2008 | Fukuyo et al. | 438/463 |
| 7,528,342 B2 | 5/2009 | Deshi | 219/121.68 |
| 7,550,367 B2 * | 6/2009 | Tamura | B23K 26/0057 257/E21.001 |
| 7,626,137 B2 | 12/2009 | Fukuyo et al. | 219/121.69 |
| 7,628,303 B2 | 12/2009 | Hoetzel | |
| 7,629,250 B2 | 12/2009 | Benson et al. | 438/637 |
| 7,638,730 B2 | 12/2009 | Yoo et al. | |
| 7,642,483 B2 | 1/2010 | You et al. | |
| 7,723,212 B2 | 5/2010 | Yamamoto et al. | |
| 7,723,641 B2 | 5/2010 | Fujii | |
| 7,726,532 B2 | 6/2010 | Gonoe | |
| 7,772,522 B2 | 8/2010 | Matsumoto et al. | |
| 7,804,043 B2 | 9/2010 | Deshi | |
| 7,812,281 B2 | 10/2010 | Acker et al. | |
| 7,816,623 B2 | 10/2010 | Otsu et al. | |
| 7,820,941 B2 | 10/2010 | Brown et al. | |
| 7,895,861 B2 | 3/2011 | Chalk et al. | |
| 7,977,602 B2 | 7/2011 | Birrell | 219/121.69 |
| 8,011,207 B2 | 9/2011 | Abramov et al. | |
| 8,051,679 B2 | 11/2011 | Abramov et al. | |
| 8,053,704 B2 * | 11/2011 | Abramov et al. | 219/121.68 |
| 8,067,713 B2 | 11/2011 | Yue | |
| 8,071,960 B2 | 12/2011 | Hoeche | |
| 8,110,776 B2 | 2/2012 | Jung et al. | 219/121.68 |
| RE43,400 E | 5/2012 | O'Brien et al. | |
| 8,171,753 B2 | 5/2012 | Abramov et al. | |
| 8,173,038 B2 | 5/2012 | Wagner | 216/97 |
| 8,183,131 B2 * | 5/2012 | Fukuyo et al. | 438/463 |
| 8,269,138 B2 | 9/2012 | Garner et al. | |
| 8,426,767 B2 | 4/2013 | Glaesemann et al. | |
| 8,543,888 B2 | 9/2013 | Bommena et al. | |
| 8,551,865 B2 | 10/2013 | Fukuyo et al. | |
| 2002/0006765 A1 * | 1/2002 | Michel et al. | 451/28 |
| 2003/0217568 A1 | 11/2003 | Koyo et al. | 65/105 |
| 2004/0002199 A1 * | 1/2004 | Fukuyo et al. | 438/460 |
| 2004/0060416 A1 | 4/2004 | Luiz | |
| 2004/0086688 A1 | 5/2004 | Hirano et al. | |
| 2004/0144231 A1 | 7/2004 | Hanada | |
| 2004/0169023 A1 | 9/2004 | Tanaka | |
| 2004/0232124 A1 * | 11/2004 | Nagai | B23K 26/0063 219/121.72 |
| 2004/0251290 A1 | 12/2004 | Kondratenko | |
| 2005/0009301 A1 * | 1/2005 | Nagai | B23K 26/0057 438/463 |
| 2005/0029321 A1 | 2/2005 | Hauer et al. | |
| 2005/0199592 A1 | 9/2005 | Iri et al. | |
| 2005/0221044 A1 | 10/2005 | Gaume et al. | |
| 2005/0258135 A1 | 11/2005 | Ishikawa et al. | |
| 2006/0021977 A1 | 2/2006 | Menegus | |
| 2006/0081101 A1 | 4/2006 | Hayashi et al. | |
| 2006/0081571 A1 | 4/2006 | Hoebel et al. | |
| 2006/0101858 A1 | 5/2006 | Fujii | |
| 2006/0137505 A1 | 6/2006 | Wakayama | |
| 2006/0228997 A1 * | 10/2006 | Chida | B24B 9/065 451/11 |
| 2007/0039932 A1 | 2/2007 | Haase et al. | |
| 2007/0039990 A1 | 2/2007 | Kemmerer et al. | |
| 2007/0051706 A1 * | 3/2007 | Bovatsek et al. | 219/121.69 |
| 2007/0062921 A1 | 3/2007 | Karube et al. | |
| 2007/0125757 A1 * | 6/2007 | Fukuyo | B23K 26/0057 219/121.72 |
| 2007/0151962 A1 | 7/2007 | Doll et al. | |
| 2007/0164072 A1 | 7/2007 | Nishio | |
| 2007/0170162 A1 | 7/2007 | Haupt et al. | |
| 2007/0178672 A1 | 8/2007 | Tanaka | |
| 2007/0228100 A1 | 10/2007 | Gonoe | |
| 2008/0000884 A1 * | 1/2008 | Sugiura et al. | 219/121.67 |
| 2008/0053972 A1 | 3/2008 | Otsu et al. | |
| 2008/0110952 A1 | 5/2008 | Kemmerer et al. | |
| 2008/0128953 A1 * | 6/2008 | Nagai | B23K 26/0063 264/400 |
| 2008/0194079 A1 | 8/2008 | Yamamoto et al. | |
| 2008/0283509 A1 | 11/2008 | Abramov et al. | |
| 2008/0292844 A1 | 11/2008 | Sabia et al. | |
| 2008/0305615 A1 | 12/2008 | Ueno et al. | |
| 2008/0311817 A1 | 12/2008 | Kawamoto | |
| 2009/0014492 A1 | 1/2009 | Haase | |
| 2009/0040640 A1 | 2/2009 | Kim et al. | |
| 2009/0126403 A1 | 5/2009 | Abramov et al. | |

(56) References Cited

U.S. PATENT DOCUMENTS

| | | |
|---|---|---|
| 2009/0159580 A1 | 6/2009 | Hsu et al. |
| 2009/0220761 A1 | 9/2009 | Dejneka et al. |
| 2009/0294419 A1 | 12/2009 | Abramov et al. |
| 2009/0294420 A1 | 12/2009 | Abramov et al. |
| 2010/0002538 A1* | 1/2010 | Frivik ............... G01V 1/3826 367/19 |
| 2010/0012632 A1* | 1/2010 | Sakamoto ............... 219/121.72 |
| 2010/0012633 A1 | 1/2010 | Atsumi et al. |
| 2010/0078417 A1 | 4/2010 | Abramov et al. |
| 2010/0089882 A1 | 4/2010 | Tamura |
| 2010/0119846 A1* | 5/2010 | Sawada ............... C03B 33/023 428/426 |
| 2010/0206008 A1 | 8/2010 | Harvey et al. |
| 2010/0210442 A1 | 8/2010 | Abramov et al. |
| 2010/0212361 A1 | 8/2010 | Abramov et al. |
| 2010/0258993 A1 | 10/2010 | Zhou et al. |
| 2010/0266874 A1* | 10/2010 | Uchiyama et al. ........ 428/846.9 |
| 2010/0279067 A1* | 11/2010 | Sabia et al. ................ 428/141 |
| 2010/0287991 A1 | 11/2010 | Brown et al. |
| 2010/0291353 A1* | 11/2010 | Dejneka ............ C03B 33/0222 428/192 |
| 2010/0294748 A1 | 11/2010 | Garner et al. |
| 2011/0000897 A1 | 1/2011 | Nakano et al. |
| 2011/0000898 A1 | 1/2011 | Rumsby ................. 219/121.72 |
| 2011/0001220 A1* | 1/2011 | Sugiura et al. ............ 257/618 |
| 2011/0027971 A1 | 2/2011 | Fukuyo et al. ............. 438/462 |
| 2011/0037149 A1 | 2/2011 | Fukuyo et al. ............. 257/620 |
| 2011/0049765 A1 | 3/2011 | Li et al. |
| 2011/0086241 A1* | 4/2011 | Hachitani et al. ........ 428/846.9 |
| 2011/0095062 A1 | 4/2011 | Maekawa |
| 2011/0127242 A1* | 6/2011 | Li ............................ 219/121.69 |
| 2011/0127244 A1 | 6/2011 | Li et al. |
| 2011/0132885 A1* | 6/2011 | Sercel ............... B23K 26/0608 219/121.72 |
| 2011/0250423 A1 | 10/2011 | Fukasawa et al. |
| 2011/0316200 A1* | 12/2011 | Iwaki ............... B23K 26/0057 264/400 |
| 2012/0000894 A1 | 1/2012 | Abramov et al. |
| 2012/0047956 A1 | 3/2012 | Li et al. |
| 2012/0135847 A1 | 5/2012 | Fukasawa et al. |
| 2012/0145331 A1* | 6/2012 | Gomez et al. .............. 156/712 |
| 2012/0175652 A1* | 7/2012 | Chyr ................. B23K 26/0084 257/98 |
| 2012/0255935 A1* | 10/2012 | Kakui ............... B23K 26/0063 219/121.6 |
| 2013/0133367 A1* | 5/2013 | Abramov et al. ................ 65/53 |
| 2013/0180665 A2* | 7/2013 | Gomez et al. .............. 156/712 |
| 2013/0224439 A1* | 8/2013 | Zhang et al. ................. 428/157 |
| 2013/0323469 A1* | 12/2013 | Abramov et al. ............ 428/155 |

FOREIGN PATENT DOCUMENTS

| | | | |
|---|---|---|---|
| CN | 102424524 | | 10/2014 |
| DE | 10029110 A1 * | 8/2001 | ......... B23K 26/0054 |
| EP | 1341730 B1 | | 8/2005 |
| GB | 1222182 A | | 2/1971 |
| JP | 2000219528 A | | 8/2000 |
| JP | 2001058281 A | | 3/2001 |
| JP | 2001080928 A | | 3/2001 |
| JP | 2004010466 A | | 1/2004 |
| JP | 2004083378 A | | 3/2004 |
| JP | 2004223796 A | | 8/2004 |
| JP | 2004352535 A | | 12/2004 |
| JP | 2005088078 A | | 4/2005 |
| JP | 2005212473 A | | 8/2005 |
| JP | 2006159747 A | | 6/2006 |
| JP | 2008007360 A | | 1/2008 |
| JP | 2008007384 A | | 1/2008 |
| JP | 2008115067 A | | 5/2008 |
| JP | 2008229711 A | | 10/2008 |
| JP | 2008247038 A | | 10/2008 |
| JP | 2009012038 A | | 1/2009 |
| JP | 2009066851 A | | 4/2009 |
| JP | 2009090598 A | | 4/2009 |
| JP | 2009280452 A | | 12/2009 |
| JP | 2010150068 A | | 7/2010 |
| TW | 457221 B | | 10/2001 |
| TW | 200307586 A | | 12/2003 |
| TW | 200811072 A | | 3/2008 |
| TW | 201040118 A | | 11/2010 |
| WO | 02100620 A1 | | 12/2002 |
| WO | 03008352 A1 | | 1/2003 |
| WO | 2004014625 A1 | | 2/2004 |
| WO | 2007094348 A1 | | 8/2007 |
| WO | 2010138451 A2 | | 12/2010 |

OTHER PUBLICATIONS

Yamamoto et al. "Three-Dimensional Thermal Stress Analysis on Laser Scribing of Glass"; Precision Engineering, 32 (2008) 301-308.

Yamamoto et al. "Thermal Stress Analysis on Laser Scribing of Glass", Journal of Laser Applications; vol. 20, No. 4, (2008), pp. 193-200.

International Search Report & Written Opinion relating to PCT/US2013/044208 filed Jun. 5, 2013; Mail Date: Sep. 18, 2013.

Non-Final Office Action dated Nov. 26, 2013, relating to U.S. Appl. No. 12/952,935, filed Nov. 23, 2010.

Notice of Allowance dated Jan. 16, 2014, relating to U.S. Appl. No. 13/217,718, filed Aug. 25, 2011.

Hamamatsu Photonics K.K. Electron Tube Division; "Stealth Dicing Technology and Applications" Mar. 2005.

Kumagai, Masayoshi, et al. "Advanced Dicing Technology for Semiconductor Wafer—Stealth Dicing." *Semiconductor Manufacturing, IEEE Transactions on* 20.3 (2007): 259-265.

XP-001240523; Stute, et al., Substitution of conventional glass cutting by laser technology, vol. 11, No. 6, Dec. 2005.

Taiwan Office Action and Search Report dated Apr. 28, 2015 relating to TW Patent Application No. 99128996.

Taiwan Notice of Allowance dated Jun. 2, 2015 relating to TW Patent Application No. 99140582.

A. Abramov, M. Black and S. Glaesemann, "Laser Separation of Chemically Strengthened Glass", Physics Procedia, vol. 5, Part 2, pp. 285-290, 2010 (published by Elsevier B.V. Amsterdam 2010).

English Translation of CN201380037781.5 Office Action dated July 19, 2016; 7 pages; Chinese Patent Office.

Search Report for TW102119971 dated Sep. 9, 2016; 1 page; Taiwan Patent Office.

Taiwan Office Action dated Feb. 9, 2017 issued in TW Patent Application No. 102119971, 9 pages.

\* cited by examiner

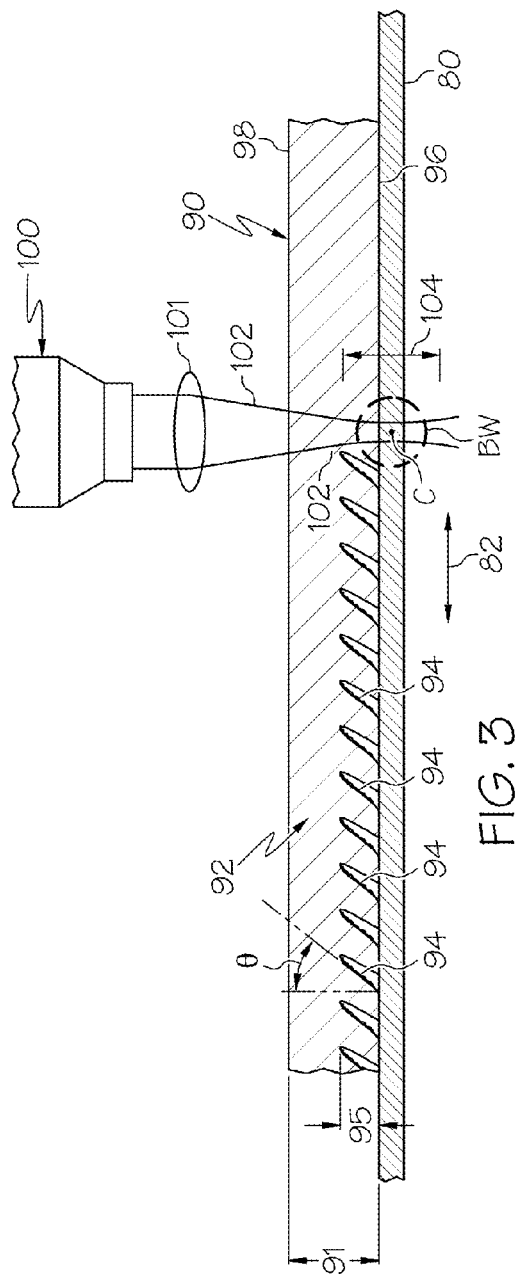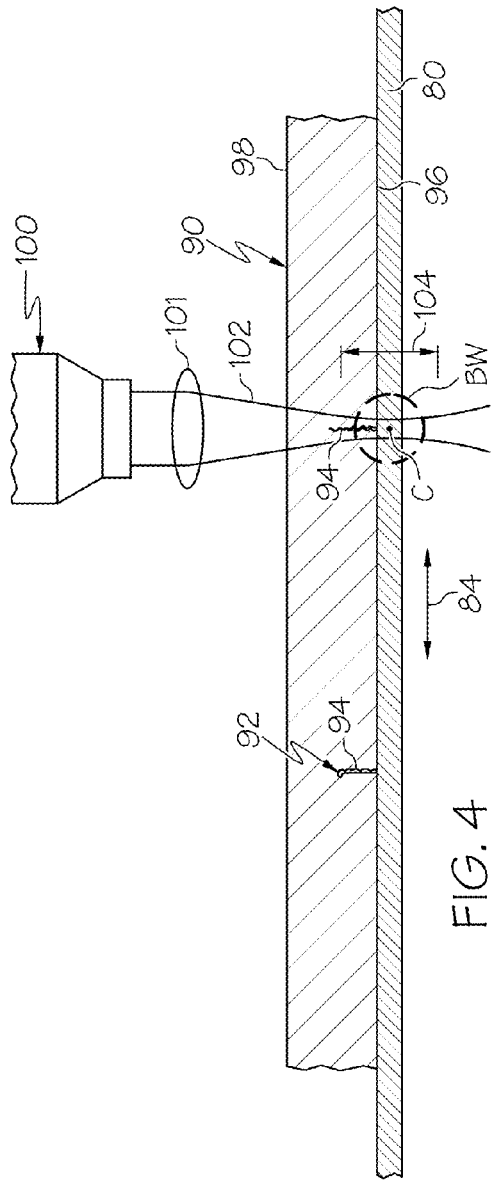

METHODS OF CUTTING GLASS USING A LASER

CROSS-REFERENCE TO RELATED APPLICATIONS

The present application claims the benefit of priority of U.S. Patent Application Ser. No. 61/655,690 entitled "Methods of Cutting Glass Using a Nanosecond Laser" filed on Jun. 5, 2012 which is hereby incorporated by reference in its entirety as if fully set forth below.

TECHNICAL FIELD

The present specification generally relates to methods of cutting glass using a laser and, more particularly, methods of cutting glass using a laser to introduce defects that extend from a surface of a glass article.

BACKGROUND

Glass articles are used in a variety of industries including the electronics industry where glass is used to cover displays. Examples of such applications include Liquid Crystal Displays and Light Emitting Diode displays, for example, computer monitors, televisions, and handheld devices. Conventionally, glass has been produced in large sheets and is scored using a mechanical scoring wheel or a laser. After being scored, an external force is applied to the glass sheet to break the glass along the score line. With the glass portioned into smaller sizes, the glass partitions undergo further processing including, for example, edge polishing and/or a chemical strengthening process.

Processing glass according to the conventional method has proven burdensome. First, when glass is broken along the score line by an application of force, the application of force tends to damage the glass portions, which may increase the scrap rate. Further, for chemically strengthened glass, introducing the smaller, separated glass articles to a chemical strengthening process after the cutting process decreases throughput, as the smaller glass articles require increased operator intervention as compared to processing a larger mother glass sheet. Therefore, conventional methods do not allow scoring and separating glass sheets after chemical strengthening, particularly at high levels of central tension inside the glass sheets because of spontaneous breakage of the glass or premature separation before scoring is completed.

Accordingly, methods of cutting glass using a laser are needed.

SUMMARY

According to various embodiments, a method of scoring a glass article includes translating a laser beam relative to a first surface of the glass article, the laser beam having a beam waist having a center. The center of the beam waist of the laser beam is positioned at or below a second surface of the glass article such that the laser beam passes through a thickness of the glass article. The laser beam creates a plurality of defects along a score line in the glass article such that the plurality of defects extends a distance into the glass article from the second surface, and at least some individual defects of the plurality of defects are non-orthogonal to the first and second surfaces of the glass article and are biased in a direction of translation of the laser beam. In cases where not all of the individual defects of the plurality of defects are non-orthogonal to the first and second surfaces of the glass article, some of the individual defects of the plurality of defects will be orthogonal to the first and second surfaces of the glass article. In some embodiments, a majority of the individual defects of the plurality of defects are non-orthogonal relative to the second surface. In some embodiments, the glass article may be an ion-exchanged glass article having a first strengthened surface layer and a second strengthened surface layer under a compressive stress extending from a surface of the ion-exchanged glass article to a depth of layer, and a central region between the first strengthened surface layer and the second strengthened surface layer that is under tensile stress. The plurality of defects may extend a distance greater than the depth of layer. In some embodiments, the central region has a tensile stress between about 20 and about 30 megapascals, and the plurality of defects extend through about half of the thickness of the ion-exchanged glass article. In other embodiments, the central region has a tensile stress greater than about 40 megapascals, and a majority of a length of the plurality of defects is within the first or second strengthened layer.

The laser beam may be translated relative to the glass article at a speed S greater than about 20 millimeters per second, in some embodiments. The laser beam may be pulsed at a frequency f from about 10 kilohertz to about 200 kilohertz, and at a wavelength from 350 nanometers to 619 nanometers, for example. The laser beam may also have a pulse duration from about 1 nanosecond to about 50 nanoseconds, in some embodiments. The laser beam may be oriented orthogonally relative to the first surface of the glass article. The glass article is transparent to a wavelength of the laser beam.

The laser beam may score the glass article in a score time, wherein the glass article remains integrally connected during the score time. In some embodiments, the plurality of defects creates a crack that propagates within the glass article such that the glass article separates along the score line. One or more edges of the one or more separated glass articles may be finished such that the one or more edges have a predetermined surface roughness. In one embodiment, the surface roughness of the edges is about 100 μm root mean squared.

According to further embodiments, a method of separating an ion-exchanged glass article includes translating a laser beam relative to a first surface of the ion-exchanged glass article, the laser beam comprising a beam waist having a center, The ion-exchanged glass article has a first strengthened surface layer and a second strengthened surface layer under a compressive stress and extending from a surface of the ion-exchanged glass article to a depth of layer, and a central region between the first strengthened surface layer and the second strengthened surface layer that is under tensile stress. The laser beam is orthogonal to the first surface of the ion-exchanged glass article. The center of the beam waist of the laser beam is positioned at or below a second surface of the ion-exchanged glass article such that the laser beam passes through a thickness of the glass article. The laser beam may ablate the second surface of the ion-exchanged glass article to create a plurality of defects that extend from ablated regions on the second surface of the ion-exchanged glass article. The plurality of defects defines one or more score lines along the ion-exchanged glass article, and at least a portion of the plurality of defects extends a distance greater than the depth of layer of the ion-exchanged glass article.

The plurality of defects creates a crack that propagates within the ion-exchanged glass article such that the ion-exchanged glass article separates along the score lines. In some embodiments, the crack created by the plurality of defects does not propagate ahead of the laser beam in a direction of translation of the laser beam. In some embodiments, individual defects of the plurality of defects are discrete with respect to one another prior to separation of the ion-exchanged glass article. The plurality of defects may be non-orthogonal with respect to the first surface of the ion-exchanged glass article and biased in a direction of translation of the laser beam. In some embodiments, a central tension region of the ion-exchanged glass article applies self-separating forces around the plurality of defects that cause individual defects of the plurality of defects to propagate through the thickness of the ion-exchanged glass article. The central region may have a tensile stress between about 20 and about 30 megapascals, and the plurality of defects may extend through about half of the thickness of the ion-exchanged glass article. In other embodiments, the central region may have a tensile stress greater than about 40 megapascals, and a majority of a length of the plurality of defects may be within the first or second strengthened layer.

The laser beam may be translated relative to the ion-exchanged glass article at a speed S greater than 200 millimeters per second, for example. Other translation speeds may also be used, depending on the application. In some embodiments, the laser beam operates at a wavelength from 350 nanometers to 619 nanometers. Additionally, the laser beam may have a pulse duration from about 1 nanosecond to about 50 nanoseconds. The laser beam may have a photon energy of at least 2 eV in some embodiments. The laser beam may be oriented orthogonally relative to the first surface of the ion-exchanged glass article.

According to still further embodiments, a glass article includes a first surface and a second surface separated by a thickness, a plurality of defects that extend from one of the first surface or the second surface through a portion of the thickness of the glass article. The plurality of defects forms at least one score line. At least a portion of the plurality of defects extends a distance less than the thickness of the glass article, the plurality of defects are non-orthogonal to the first surface and the second surface, and the plurality of defects are biased in a single direction along the at least one score line. In some embodiments, the glass article includes an ion-exchanged glass article having a first strengthened surface layer and a second strengthened surface layer under a compressive stress and extending from a surface of the ion-exchanged glass article to a depth of layer, and a central region between the first strengthened surface layer and the second strengthened surface layer that is under tensile stress. The distance that the plurality of defects extends into the glass article may be greater than the depth of layer.

The central region may have a tensile stress between about 20 and about 30 megapascals, and the plurality of defects may extend through about half of the thickness of the ion-exchanged glass article. In other embodiments, the central region may have a tensile stress greater than about 40 megapascals. The majority of a length of the plurality of defects may be within the first or second strengthened layer when the central region has a tensile stress greater than about 40 megapascals, in some embodiments.

According to still further embodiments, a glass article includes a first surface and a second surface separated by a thickness t, an edge joining the first surface and the second surface, and a plurality of defects at the edge that extends from the first surface or the second surface of the glass article through a portion of the thickness t of the glass article. The plurality of defects extends into the thickness t of the glass article, and at least a portion of the plurality of defects is non-orthogonal to the first surface or the second surface and is biased in a single direction along the edge. The plurality of defects may extend into a majority of the thickness t of the glass article. In some embodiments, at least portions of the individual defects of the plurality of defects are formed by laser ablation.

The glass article may include an ion-exchanged glass article having a first strengthened surface layer and a second strengthened surface layer under a compressive stress and extending from a surface of the ion-exchanged glass article to a depth of layer, and a central region between the first strengthened surface layer and the second strengthened surface layer that is under tensile stress. The distance that the plurality of defects extends into the strengthened glass article may be greater than the depth of layer. In some embodiments, the central region has a tensile stress between about 20 and about 30 megapascals, and the plurality of defects extend about halfway into the thickness of the ion-exchanged glass article. In other embodiments, wherein the central region has a tensile stress greater than about 40 megapascals, and a majority of a length of the plurality of defects are within the first or second strengthened layer.

According to still further embodiments, an ion-exchanged glass article includes a first surface and a second surface separated by a thickness t, and a first strengthened surface layer and a second strengthened surface layer under a compressive stress and extending from the first surface and the second surface, respectively, of the ion-exchanged glass article to a depth of layer, and a central region between the first strengthened surface layer and the second strengthened surface layer that is under tensile stress greater than about 40 megapascals. The ion-exchanged glass article further includes an edge joining the first surface and the second surface, and a plurality of defects at the edge that extend from the first surface or the second surface of the ion-exchanged glass article through a portion of the thickness t of the ion-exchanged glass article. At least portions of the individual defects of the plurality of defects are formed by laser ablation. A majority of a length of the plurality of defects is within the first or second strengthened layer.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 3 schematically depicts a right sectional view along line A-A of FIG. 2 of the laser scoring the glass article in the first direction according to one or more embodiments shown or described herein;

FIG. 4 schematically depicts a front sectional view along line B-B of FIG. 2 of the laser scoring the glass article in the first direction according to one or more embodiments shown or described herein;

DETAILED DESCRIPTION

Figure 1A:
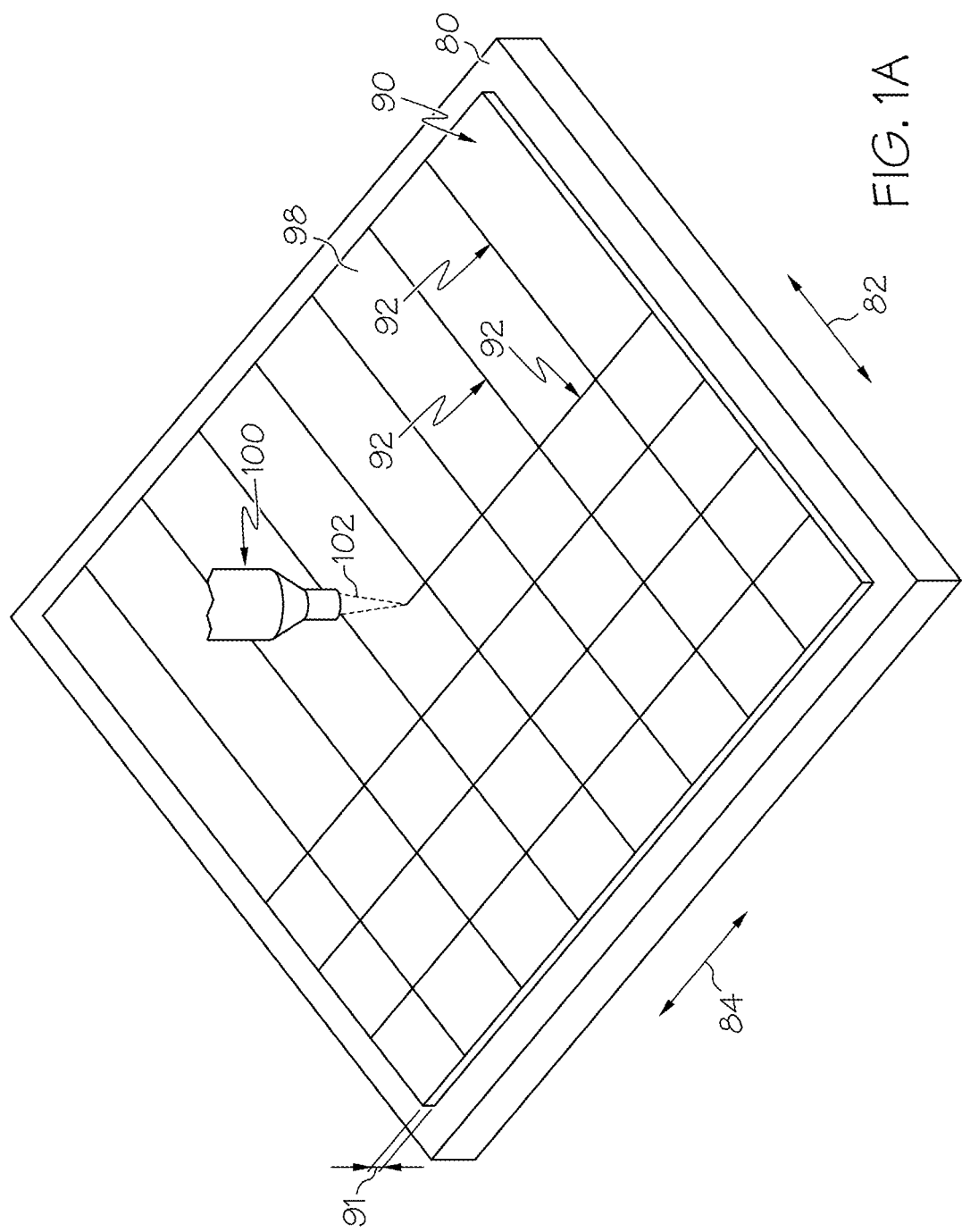
FIG. 1A schematically depicts a perspective view of a laser scoring a glass article in a first direction and a second direction according to one or more embodiments shown or described herein.

Reference will now be made in detail to embodiments of methods of separating a glass article into a plurality of individual, separated glass articles by a laser, examples of which are illustrated in the accompanying drawings. Whenever possible, the same reference numerals will be used throughout the drawings to refer to the same or like parts. One embodiment of the method of separating a glass article using a laser is depicted in FIG. 1A. The laser beam produced by the laser is translated relative to the glass article in a first direction and a second direction transverse to the first direction. The laser beam creates a plurality of defects on a second surface of the glass article that define score lines. The defects allow the glass article to remain integral during a time period in which the laser is scoring the glass article. The defects continue to grow, however, during the score time. The defects grow at a rate such that the defects propagate through a thickness of the glass article such that the glass article self-separates along the score lines after the score time. Methods of cutting glass will be described in more detail herein with specific reference to the appended drawings.

Referring now to FIG. 1A, a glass article 90 is positioned on a translation table 80. The glass article 90 may be substantially in contact with the translation table 80. However, due to variations in the glass article 90, portions of the glass article 90 may be spaced apart from the translation table 80. A laser 100 is positioned above the translation table 80 and introduces a laser beam 102 to the glass article 90. The laser beam 102 is transverse to a first surface 98 of the glass article 90 and moves relative to the glass article 90 in a first direction 82 to create a plurality of score lines 92 in the first direction 82. Although the laser beam 102 is illustrated as being orthogonal with respect to the first surface 96 of the glass article 90, embodiments are not limited thereto; the laser beam 102 may be non-orthogonal with respect to the first surface 96 of the glass article 90 in some embodiments. Each score line 92 may be generated by a single pass of the laser beam 102 relative to the glass article 90. The laser beam 102 also moves relative to the glass article 90 in a second direction 84. In some embodiments, the laser 100 may be coupled to a gantry (not shown) that translates the laser 100 in the first direction 82 and the second direction 84. In other embodiments, the laser 100 may be stationary and the translation table 80 supporting the glass article 90 moves in the first direction 82 and the second direction 84.

The glass article 90 may be securely maintained in position on the translation table 80 by the use of mechanical or vacuum chucking. Vacuum chucking may be achieved by a series of vacuum holes spaced some distance apart on a vacuum platen. However, the stress gradient generated by the holes may distort the stress field enough to affect the laser scribing process of the glass article 90. The stress gradient from the vacuum suction can be minimized by using closely spaced holes or a porous plate because both may decrease the amount of vacuum needed to hold down the glass article 90 to the translation table 80.

The laser 100 is operable to emit a laser beam 102 having a wavelength suitable for imparting thermal energy to a surface of the glass article 90. Suitable laser 100 sources include a diode-pumped q-switched solid-state Nd:YAG laser or Nd:YVO4 laser with an average power from about 6 Watts to about 35 Watts and pulse peak power of at least 2 kilowatts. Because the glass article 90 is substantially transparent at the wavelength of the laser beam 102, it is possible to position a beam waist BW at or below (outside) the second surface 96 of the glass article 90 without causing damage within the bulk of the glass article 90 or on the first surface 98.

The pulse duration of the laser 100 may be in the range from about 1 nanosecond to about 50 nanoseconds, for example, from about 15 nanoseconds to about 22 nanoseconds. As a non-limiting example, the beam waist BW may have a diameter of about 8 μm. The pulse repetition rate may be in the range from about 10 kilohertz to about 200 kilohertz, for example from about 40 kilohertz to about 100 kilohertz. As discussed hereinabove, suitable lasers 100 for using the separation method discussed herein may produce a laser beam 102 in the visible light range (i.e., from about 380 nanometers to about 619 nanometers (380 nanometers corresponds to photon energy of about 3.26 eV; 2.00 eV corresponds to the wavelength of about 619 nanometers)). Such a laser 100 may produce a laser beam 102 at a wavelength from about 380 to about 570 nanometers, for example at a wavelength of about 532 nanometers. Lasers 100 producing beams 102 at this wavelength have high efficiency of transferring energy to the glass article 90. This may be attributed to combination of the interaction of the laser beam 102 with the glass article 90 and the high photon energy carried by the laser beam 102 having a 532 nanometer wavelength. Lasers 100 used according to the disclosed method may have photon energy of at least 2 eV. It is noted that a wavelength of 532 nanometers, the photon energy is 2.32 eV; longer wavelength has lower photon energy, and shorter wavelength has higher photon energy.

Where material is transparent to the laser beam wavelength, little or no change to the material may be expected, but if the laser intensity is high enough, it may induce absorptive nonlinear optical effects (multi-photon absorption, avalanche ionization, and the like). When the laser intensity is above a threshold, the material of the glass article 90 may be modified via a nonlinear effect known as multi-photon absorption at or near the beam waist. Multi-photon absorption relies on the response of the glass material to a high intensity electromagnetic field generated by the pulsed laser beam 102 that ionizes electrons and leads to optical breakdown and plasma formation. By translating or scanning the beam waist BW at or below the second surface 96, a portion of the second surface 96 may be ablated by laser ablation to create the defects described in detail below. As used herein "ablation" and "laser ablation" mean the removal of glass material from the glass article by vaporization due to the energy introduced by the laser beam.

Figure 1B:
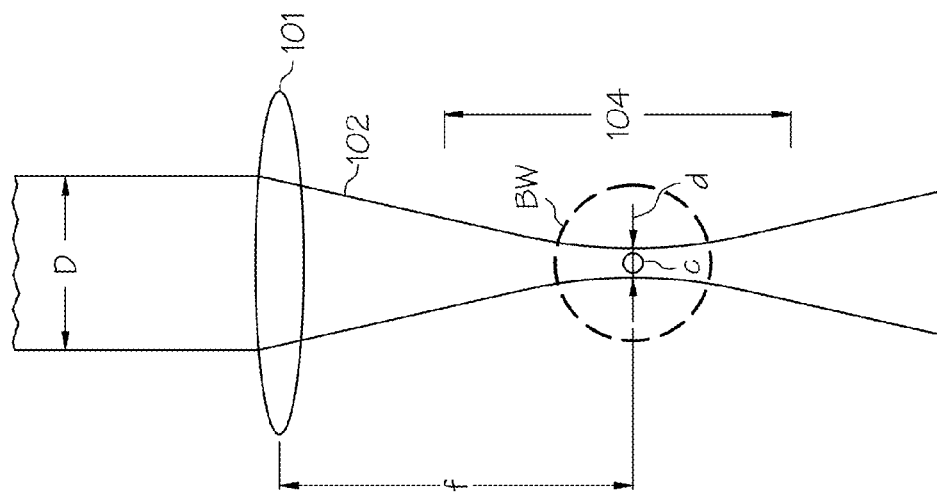
FIG. 1B schematically depicts a laser beam according to one or more embodiments shown or described herein.

FIG. 1B schematically depicts a laser beam 102 in greater detail. In one embodiment, the laser beam 102 is generated by a laser 100 as described above, and then focused by focusing optics, such as a focusing lens 101. It should be understood that the focusing optics may comprise additional lenses or other optical components to focus and condition the laser beam 102. The laser beam 102 is focused such that it has a focal area 104 that is determined by the depth of focus of the focused laser beam 102. The focusing lens 101 may be configured to focus the pulsed laser beam 102 to form a small beam waist BW, which is a portion of the laser beam 102 having a reduced diameter d. The beam waist diameter d is smaller than the unfocused portion diameter D. The beam waist BW has a center C, which is the region of the laser beam 102 having the smallest diameter d. As described below, the laser beam 102 may be focused such that the center C of the beam waist BW is located at or below the second surface 96 of the glass article 90 and is not positioned within the bulk of the glass article 90. It is noted that, in some embodiments, the beam waist BW may be positioned within the bulk of the glass article 90 proximate the second surface 96. As an example and not a limitation, the beam waist BW may be positioned within the glass article 90 at a distance of about 100 µm from the second surface 96.

Because multi-photon absorption is a nonlinear process, the magnitude of its effect varies quickly with the applied optical intensity of the laser pulse. The intensity provides the instantaneous energy flux delivered by the optical pulse through the center C of the beam waist BW.

The depth of focus of the laser beam 102 may be further controlled by a variety of factors including the quality of the laser beam 102 itself, which may be denoted by the "$M^2$" value of the laser beam 102. The $M^2$ value of a laser beam 102 compares a beam parameter product, which is the product of a laser beam's divergence angle and the radius of the beam at its narrowest point (i.e., the center C of the beam waist BW), of an actual laser beam 102 to a Gaussian beam operating at the same wavelength. The lower the $M^2$ value of a laser beam 102, the smaller the laser beam 102 can be focused to a beam waist BW. Exemplary lasers 100 used in the process described herein may have an $M^2$ value less than about 1.2, for example, less than about 1.05. Laser beams 102 having such an $M^2$ value can be focused with a high degree of precision. Such a laser beam 102 can have an effective depth of focus from about 50 microns to about 1000 microns. In some embodiments, additional optics placed between the laser 100 and the glass article 90 may be used to focus the laser beam 102.

The process disclosed herein can be used to separate both non-strengthened glass and chemically strengthened glass, as will be discussed in further detail below. The glass may vary in composition and in thickness. Embodiments of the laser 100 described hereinabove may be used to score and separate non-strengthened glass; for example, having a thickness from about 0.1 millimeter to about 2.0 millimeters.

While FIG. 1A depicts the glass article 90 being separated into a plurality of rectangular glass articles, it should be understood that any configuration/shape of the separated glass articles of the glass article 90 may be produced according to the methods disclosed herein based on the required end-user application. For example, the glass article 90 may be separated into individual glass articles having arbitrary shapes (e.g., curved edges). In addition, the separated glass articles may be further processed to finish the separated glass article to the required end shape including, but not limited to further cutting, edge polishing and other edge treatment processes. In some embodiments, the edges of the separated glass article may be finished to a predetermined surface roughness. As an example and not a limitation, the edges of the separated glass article(s) may be finished to a surface roughness below about 100 µm root mean squared ("RMS"). It should be understood that, in other embodiments, the surface roughness of the edges is greater than about 100 µm RMS.

Figure 2:
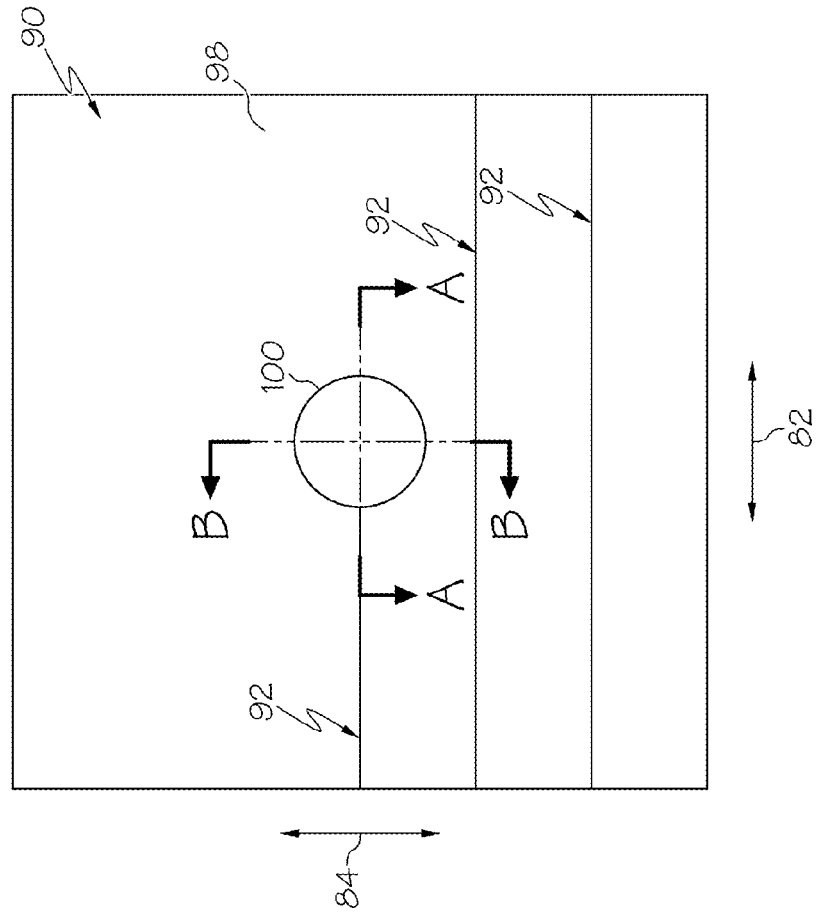
FIG. 2 schematically depicts a top view of a laser scoring a glass article in a first direction according to one or more embodiments shown or described herein.

Referring now to FIG. 2, a top view of an intermediate step of a method of separating the glass article 90 is depicted. As discussed hereinabove, the laser 100 may be positioned such that the laser beam is orthogonal with respect to the first surface 98 of the glass article 90. The laser 100 is translated relative to the glass article 90 in a first direction 82 creating a plurality of score lines 92 positioned along the first direction 82. Referring now to FIG. 3, one score line 92 is depicted in detail. The score line 92 is made of a plurality of defects 94 that extend from a second surface 96 of the glass article 90. The defects 94 are voids and cracks on and within the glass article 90 that are formed by laser ablation at the second surface as the laser beam 102 translates relative to the glass article 90. The laser beam 102 is focused and positioned such that the center C of the beam waist BW is located at or below the second surface 96 of the glass article 90 in the illustrated embodiment. The location of the beam waist BW allows for some variation in the position of the glass article 90 along the translation table 80, with the laser beam 102 still scoring the second surface 96 of the glass article 90. As shown in FIG. 3, at least some of the individual defects 94 may be non-orthogonal with respect to the second surface 96 and biased in a direction of the laser beam 102 at a bias angle θ away from normal with respect to the second surface 96. As used herein, the term "non-orthogonal" with respect to the plurality of defects 94 means that at least some of the individual defects of the plurality of defects are biased at any angle other than ninety degrees with respect to the surface glass article in a direction of the translation of the laser beam. Therefore, a termination location of at least some of the defect 94 is offset a distance of an initiation location by a distance in the direction of laser travel. In some embodiments, a majority of the individual defects 94 are non-orthogonal with respect to the second surface 96. In other embodiments, substantially all of the individual defects 94 are non-orthogonal with respect to the second surface 96.

By focusing the laser beam 102 such that the center C of the beam waist BW of the laser beam 102 is positioned at or below the second surface 96 of the glass article 90, the laser beam 102 initiates a defect 94 that starts on the second surface 96 of the glass article 90. The laser beam 102 initiates the defects 94 by introducing heat to the glass article 90, which causes material of the glass article 90 to ablate and fracture along the second surface 96. Such defect initiation may form craters (e.g., craters 497 of FIG. 10) on the second surface 96. Further, because the portion of the glass article 90 proximate to the second surface 96 is also positioned within the focal area 104 of the laser beam 102, the laser beam 102 also introduces some thermal energy into the portion of the glass article 90 proximate to the second surface 96. This continuation of introduction of thermal energy by a portion of the laser beam 102 that is outside of the beam waist BW into the glass article 90 causes the defect 94 to grow from the second surface 96 into the thickness 91 of the glass article 90, so long as the intensity of the laser beam supports non-linear interaction. The defects 94 extend a defect distance 95 into the glass article 90 that is less than the thickness 91 of the glass article 90. The defect distance 95 may approximately correspond to the focal area 104 of the laser beam 102 that extends into the thickness 91 of the glass article 90 when the intensity of the laser beam supports non-linear interaction/absorption. Further, the laser beam 102 causes the defects 94 to extend into the thickness 91 of the glass article 90 without changing the vertical position of the beam waist BW or of the focal area 104 of the laser beam 102. The distance the defects 94 extend into the thickness 91 of the glass article 90 may also be affected by the traversal speed of the laser 100 relative to the glass article 90, the composition and thickness of the glass article 90, laser properties, and other factors.

Further, the bias angle θ of the defects 94 may be influenced by the translation speed of the laser beam 102 with respect to the glass article 90. Generally, the faster the translation speed, the larger the bias angle θ. For example, for a non-strengthened glass substrate, the laser 100 may translate along the glass article 90 at a speed greater than about 20 millimeters per second to create defects that are non-orthogonal with respect to the first or second surface. For example, when the laser beam is translated at a slow speed of less than about 20 millimeters per second, the defects grow almost at a normal angle relative to the glass surface, unlike the case when translation speed is high, such as at 1000 millimeters per second, which causes angled defects.

The growth of the defects 94 from the ablation regions positioned on the second surface 96 of the glass article 90 (e.g., craters 497, 597) may be caused by further laser ablation due to the laser beam 102, crack growth due to induced stress in the glass article 90, weakened material strength due to the laser beam 102, tensile stress inside strengthened glass, or combinations thereof. The defects 94 may be irregularly shaped and jagged; however the defects 94 are generally non-orthogonal with the second surface 96 and the first surface 98 of the strengthened glass article 190, and are biased in the direction of travel of the laser 100. In the embodiment depicted in FIGS. 3 and 4, the defects 94 are biased in the first direction 82 at the bias angle θ, and generally appear normal to the second surface 96 when evaluated in the direction of laser traversal. FIG. 4 depicts the glass sheet and score lines depicted in FIG. 1A along lines B-B.

In some embodiments, for example when the glass article 90 is a non-strengthened glass substrate, the defects 94 are terminated within the thickness 91 of the glass article 90. The defects 94 therefore define score lines 92 which macroscopically indicate weakened regions of the glass article 90. Such glass articles 90 may retain some mechanical strength in positions surrounding the score lines 92, which may enable handling of the scored glass articles 90 without separating the glass article 90 into smaller glass portions or articles. Further, the glass article 90 may be mechanically (or thermally) separated in a later operation after scoring by the laser 100 is completed. For example, the glass article 90 may be separated along one or more score lines 92 by applying a bending moment to the glass article 90, subsequently heating the glass article 90 (e.g., submerging the glass article in a heated bath), subsequently heating and cooling the glass article, submerging the glass article in a water bath at room temperature, and the like.

Figure 5:
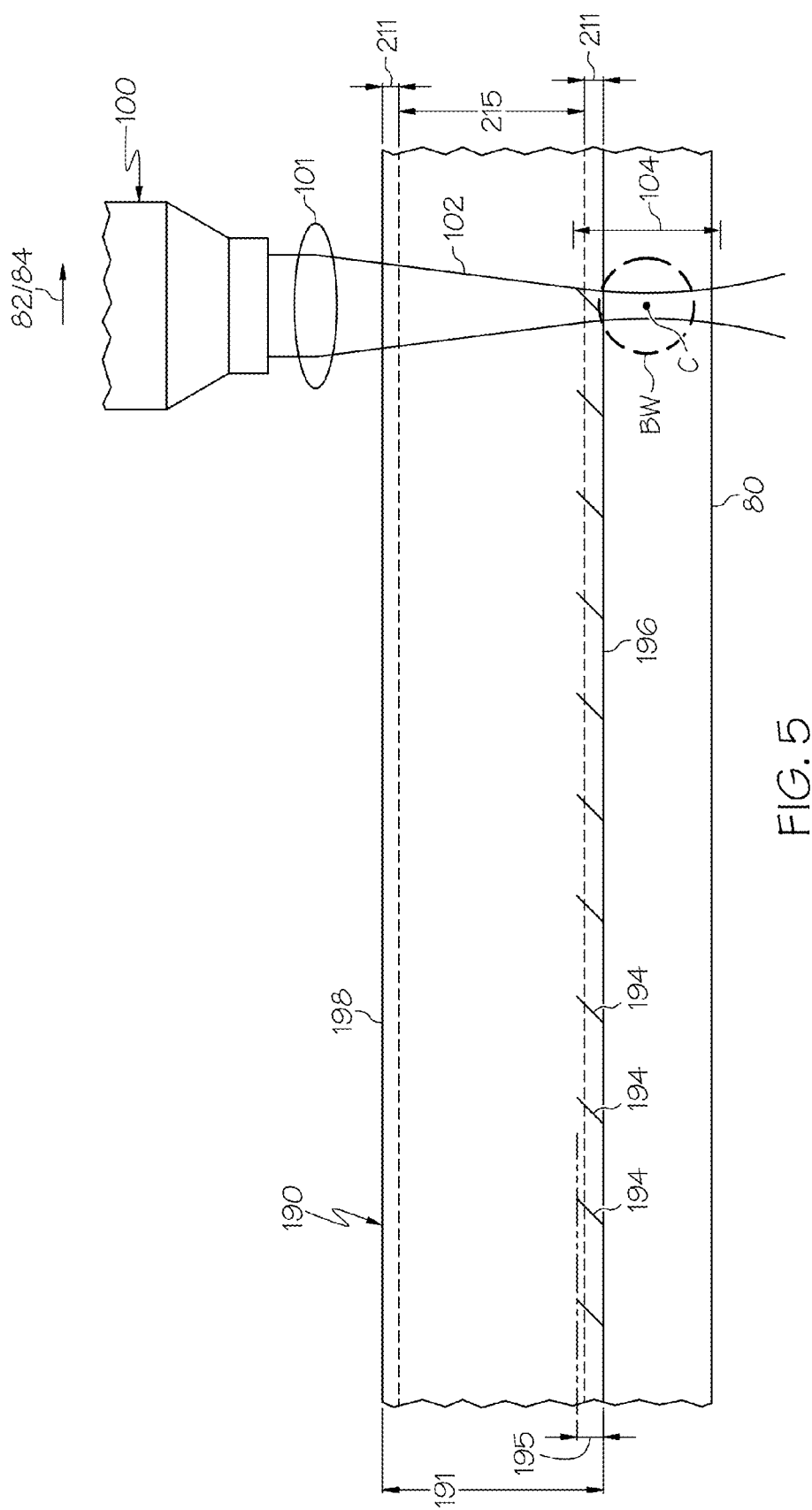
FIG. 5 schematically depicts a right sectional view of a laser scoring a chemically-strengthened glass article during a score time according to one or more embodiments shown or described herein.

Referring now to FIG. 5, the above-described methods can be used to score strengthened glass articles 190. Strengthened glass articles 190 may comprise or consist of any glass that is either thermally or chemically strengthened using currently known or yet-to-be-developed methods. In one embodiment, the strengthened glass article 190 is, for example, a soda lime glass. In another embodiment, strengthened glass article 190 is an alkali aluminosilicate glass. The strengthened glass article 190 may be chemically strengthened by an ion-exchange process to produce compressive surface layers 211 (i.e., first and second strengthened layers) and an inner tension layer 215 within the strengthened glass substrate.

In one embodiment, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)–$Al_2O_3$≥2 mol %; 2 mol %≤$Na_2O$–$Al_2O_3$≤6 mol %; and 4 mol %≤($Na_2O$+$K_2O$)–$Al_2O_3$≤10 mol %.

In another embodiment, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %.

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO.

In another embodiment, the alkali aluminosilicate glass comprises at least 50 mol % $SiO_2$ and at least one modifier selected from the group consisting of alkali metal oxides and alkaline earth metal oxides, wherein [($Al_2O_3$ (mol %)+$B_2O_3$ (mol %))/($\Sigma$ alkali metal modifiers (mol %))]>1. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$.

In another embodiment, the alkali aluminosilicate glass comprises $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$.

In still other embodiments, the alkali aluminosilicate glass comprises at least about 4 mol % $P_2O_5$, wherein ($M_2O_3$ (mol %)/$R_xO$(mol %))<1, wherein $M_2O_3$=$Al_2O_3$+$B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1\cdot Al_2O_3-28.7\cdot B_2O_3+15.6\cdot Na_2O-61.4\cdot K_2O+8.1\cdot(MgO+ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO.

In some embodiments, the alkali aluminosilicate glasses described hereinabove are substantially free of (i.e., contain 0 mol % of) at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise.

As previously described herein, the strengthened glass article 190, in one embodiment, is chemically strengthened by an ion exchange process in which ions in the surface layer of the glass are replaced by larger ions having the same valence or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations other than alkali metal cations, such as $Ag^+$, $Tl^+$, $Cu^+$, or the like.

The ion-exchange process creates a compressive stress at the surfaces of the glass sheet. These compressive stresses extend beneath the surface of the glass sheet to a certain depth, referred to as the depth of layer. The compressive stresses are balanced by a layer of tensile stresses (referred to as central tension) such that the net stress in the glass sheet is zero. The formation of compressive stresses at the surface of the glass sheet makes the glass strong and resistant to mechanical damage and, as such, mitigates catastrophic failure of the glass sheet for flaws which do not extend through the depth of layer.

In one embodiment, the strengthened glass article 190 is chemically strengthened by ion-exchange in which smaller sodium ions near the surface of the glass are exchanged with larger potassium ions when the glass article 90 is placed in an ion exchange bath. Replacement of the smaller sodium ions with the larger potassium ions causes a layer of compressive stress to develop in the surfaces of the strengthened glass article 190. The compressive stress extends below the surfaces of the strengthened glass article 190 to a specified depth of layer (compressive surface layer) 211, as shown in FIG. 5. A compressive surface layer extends from the first surface 198 (i.e., a first compressive surface layer) and the second surface 196 (i.e., a second compressive surface layer) to the depth of layer. The compressive surface layer 211 is balanced by the development of the internal tension layer 215 at the center of the strengthened glass article 190.

In the embodiments described herein, the compressive stress and depth of layer developed in the strengthened glass article 190 by strengthening are sufficient to improve the damage tolerance of the strengthened glass article 190 while also facilitating further processing (such as by machining or laser processing) without risk of introducing flaws into the glass article. In one embodiment, the compressive stress may be from about 200 MPa to about 1000 MPa. In another embodiment, the compressive stress may be from about 500 MPa to about 800 MPa. In yet another embodiment, the compressive stress may be from about 650 MPa to about 900 MPa. In one embodiment, the depth of layer may be from about 10 microns to about 80 microns. In another embodiment, the depth of layer may be from about 30 microns to about 60 microns. In yet another embodiment, the depth of layer may be from about 40 microns to about 60 microns.

Similar to the non-strengthened exemplary glass article 90 discussed above, the laser beam 102 initiates a plurality of defects 194 in the strengthened glass article 190 as shown in FIG. 5. The center C of the beam waist BW is located at or below the second surface 196 of the strengthened glass article 190. The laser beam 102 ablates the second surface 196 of the strengthened glass article 190, creating a plurality of ablation regions (e.g., craters 497, 597 in FIGS. 10 and 11, respectively). As the laser beam 102 translates relative to the strengthened glass article 190 in the first direction 82, the defects 194 extend away from the ablation regions and extend a partial distance into the thickness 191 of the strengthened glass article 190. In the embodiment depicted in FIG. 5, the defects 194 extend a defect distance 195 less than the thickness 191 of the strengthened glass article 190. At least some of the defects 194 extend a defect distance 195 that is greater than the depth of the compressive surface layer 211. Restated, at least some of the defects 194 extend through the compressive surface layer 211 into the inner tension layer 215 of the strengthened glass article 190. Generally, the greater the compressive stress of the compressive surface layer 211, the shorter the defects 194 within the strengthened glass article 190.

Figure 6:
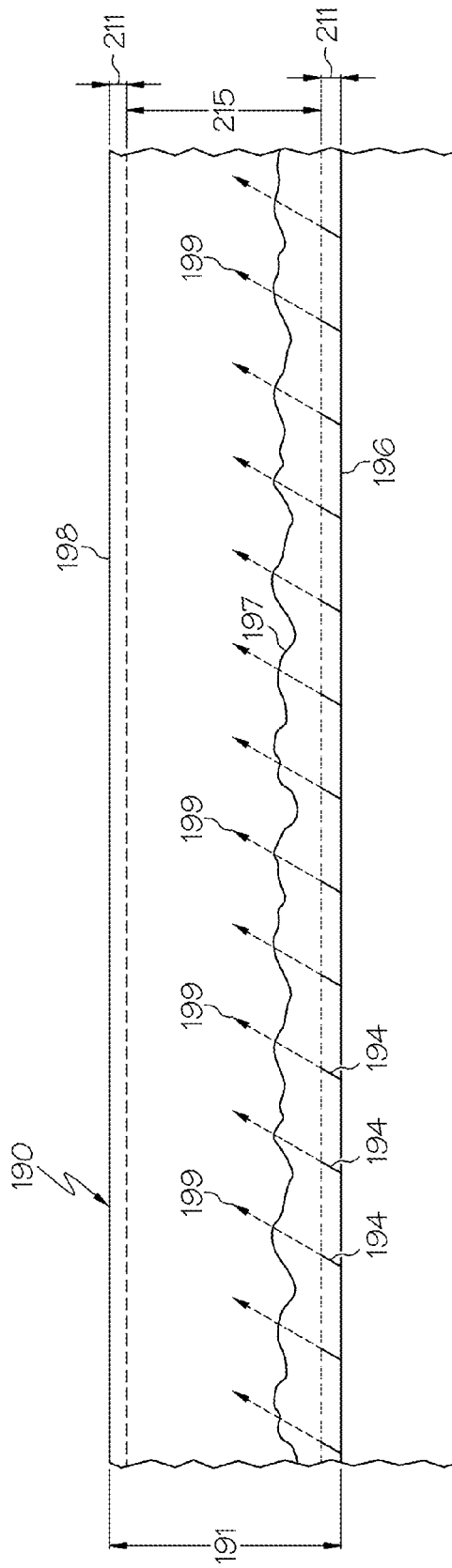
FIG. 6 schematically depicts a right sectional view of a laser scoring a chemically-strengthened glass article at a score time plus an interval according to one or more embodiments shown or described herein.

Referring now to FIG. 6, a section of the strengthened glass article 190 is shown at a time after the laser 100 translates away from the region of the strengthened glass article 190 depicted in FIGS. 5 and 6. The defects 194 continue to grow into the thickness 191 of the strengthened glass article 190 and towards one another, as indicated by arrows 199. The growth of the defects 194 create a crack having a crack propagation front 197 as the defects 194 grow into the strengthened glass article 190. In some cases, the crack propagation front 197 may be defined by several individual crack propagation fronts that grow toward one another to form a single crack that separates the glass article 190. The defects 194 may remain visible after the crack propagation front 197 moves away from the second surface 196 of the strengthened glass article 190. The crack propagation front 197 continues to grow toward the first surface 198 because of the stress in the compressive surface layers 211 and the inner tension layer 215. In addition, the stress field though the thickness 191 of the strengthened glass article 190 may contribute to the growth of the crack propagation front 197 across the thickness 191 of the strengthened glass article 190.

Figure 7:
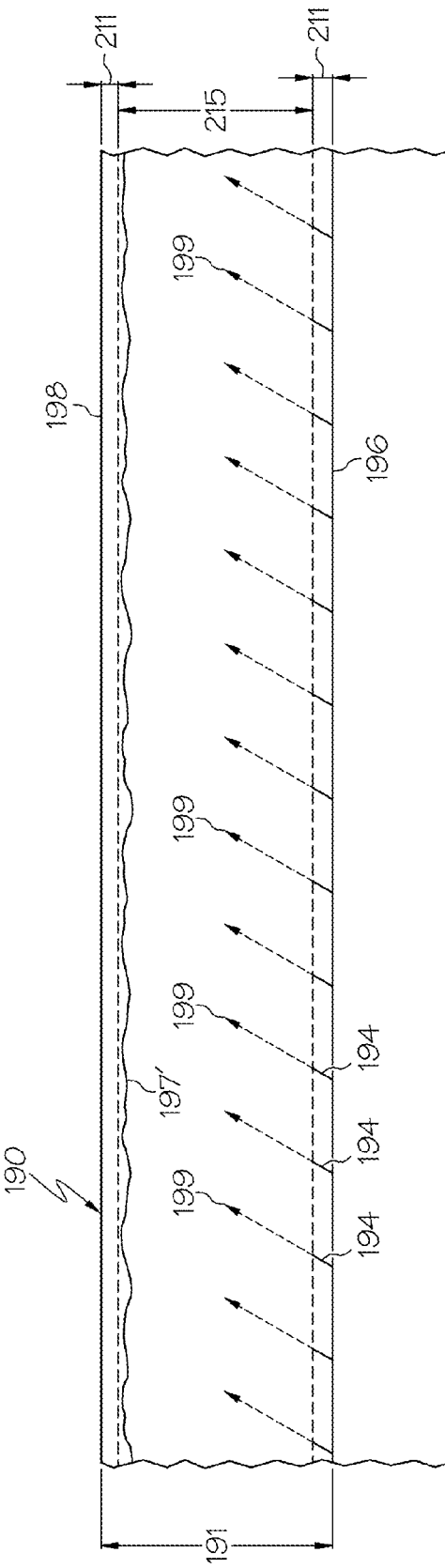
FIG. 7 schematically depicts a right sectional view of a laser scoring a chemically-strengthened glass article after the score time according to one or more embodiments shown or described herein.
Figure 8:
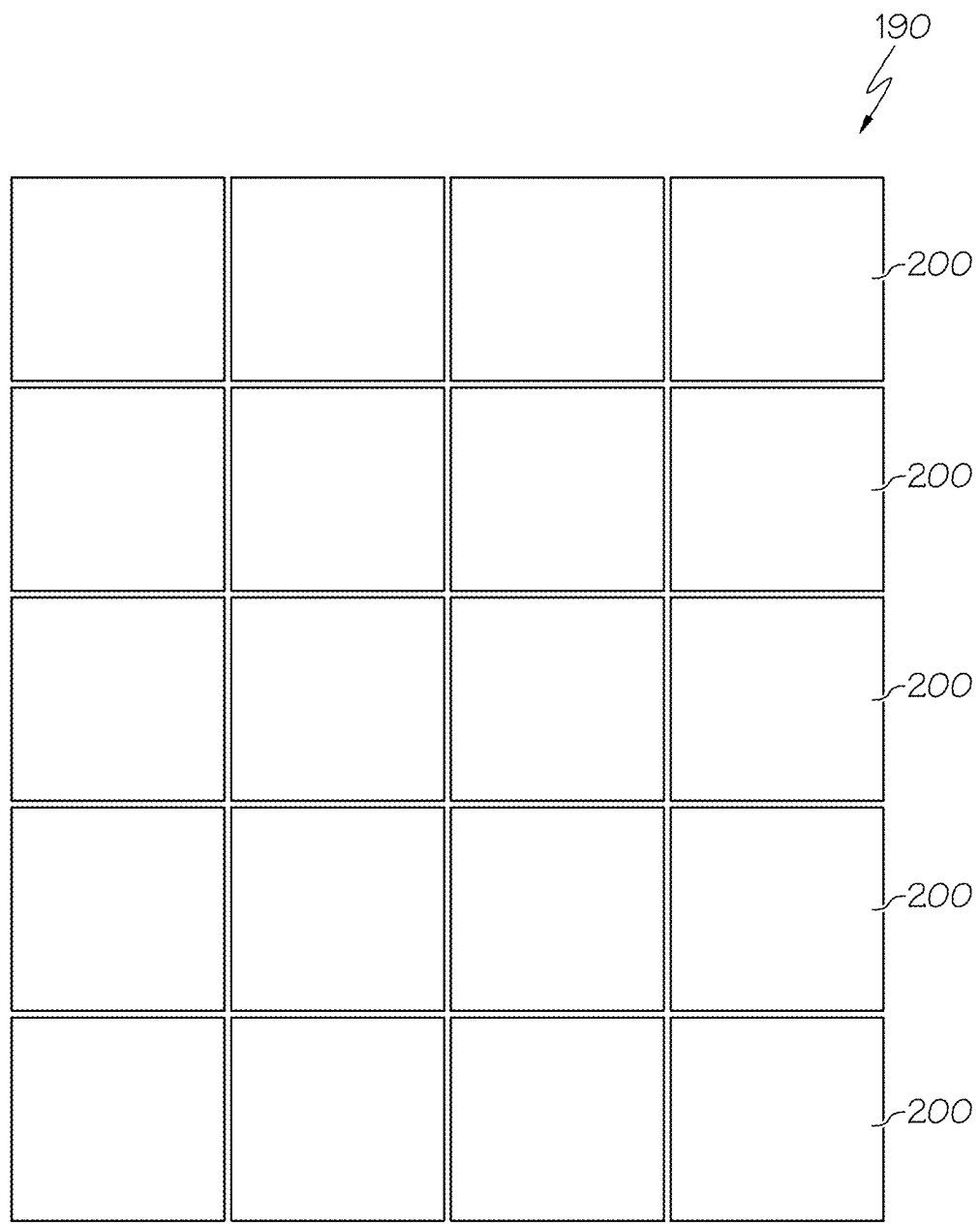
FIG. 8 schematically depicts a top view of a plurality of separated glass articles separated from a glass article according to a method of cutting glass as shown or described herein.

Depending on the various processing parameters of the scoring process and the strengthened glass article 190, the defects 194 may terminate as illustrated in FIG. 6, where the crack propagation front 197 (or fronts) is positioned in the inner tension layer 215. However, in certain embodiments, the crack propagation front 197 continues to grow across the thickness 191 of the strengthened glass article 190. Referring now to FIG. 7, a section of the strengthened glass article 190 is shown at a time after the time period shown in FIG. 6. The crack propagation front 197 continues to grow through the thickness 191 of the strengthened glass article 190. The defects 194 may continue to be visible near the second surface 196 of the strengthened glass article 190. The crack propagation front 197 grows such that any distinct, individual crack propagation fronts 197 extending from the defects 194 have grown towards one another, forming the generally-continuous crack propagation front 197' of FIG. 7. The crack propagation front 197' continues to grow through the entire thickness 191 of the strengthened glass article 190, causing the strengthened glass article 190 to separate into a plurality of separated individual glass articles 200 along the score lines 192, as illustrated in FIG. 8. The separated individual glass articles 200 may have one or more edges comprising the non-orthogonal defects 194.

As discussed hereinabove, the laser 100 creates a plurality of defects 194 in the strengthened glass article 190 as the laser 100 translates in a first direction 82 and a second direction 84. The defects 194 continue to extend into the thickness 191 of the strengthened glass article 190, forming one or more crack propagation fronts 197 that grow toward one another and across the thickness 191 of the strengthened glass article 190 at a time after the laser 100 has translated away from the recently formed defects 194. Thus, the strengthened glass article 190 often does not require additional application of force to separate the strengthened glass article 190 along the score lines 192. As such, the strengthened glass article 190 is "self-separating." In some embodiments, separation of the glass article 190 may be encouraged by application of a bending moment, submerging the glass article 190 in a bath, and similar separation techniques. The time that it takes the laser 100 to initiate all of the defects 194 in the strengthened glass article 190, thereby forming the score lines 192, is defined as the "score time." The time between the initiation of the defects 194 by the laser 100 and the self-separation of the strengthened glass article 190 along the score lines 192 is defined as the "self-separating time." The self-separation time of the strengthened glass article 190 may be controlled by a variety of factors including, but not limited to, the depth of the compressive surface layers 211, the thickness of the inner tension layer 215, the magnitude of the tension in the inner tension layer 215, the thickness of the strengthened glass article 190, the initial depth 195 of the initial defects 194, and the spacing between the defects 194.

A strengthened glass article 190 processed according to the method described hereinabove is processed such that the laser 100 scores the strengthened glass article 190 a plurality of times in the first direction 82 and a plurality of times in the second direction 84 to create score lines 192 corresponding to the desired size of the plurality of separated glass articles 200 of the strengthened glass article 190 that are required by an end-user application. The laser 100 may complete the plurality of score lines 192 in a score time that is less than the self-separating time. In other words, the crack propagation front does not propagate ahead of the laser beam 102 as the laser beam 102 is translated relative to the strengthened glass article 190. Thus, the strengthened glass article 190 may retain some mechanical structure during the time period in which the laser 100 is completing the score lines 192. At a time after the laser 100 completes all of the score lines 192, the strengthened glass article 190 may self-separate along the score lines 192. By delaying the timing of the self-separation of the strengthened glass article 190, the score lines 192 can be created while the strengthened glass article 190 is integrally connected, thereby improving dimensional accuracy of the separated glass articles 200 of the strengthened glass article 190.

EXAMPLES

Example 1

Figure 9:
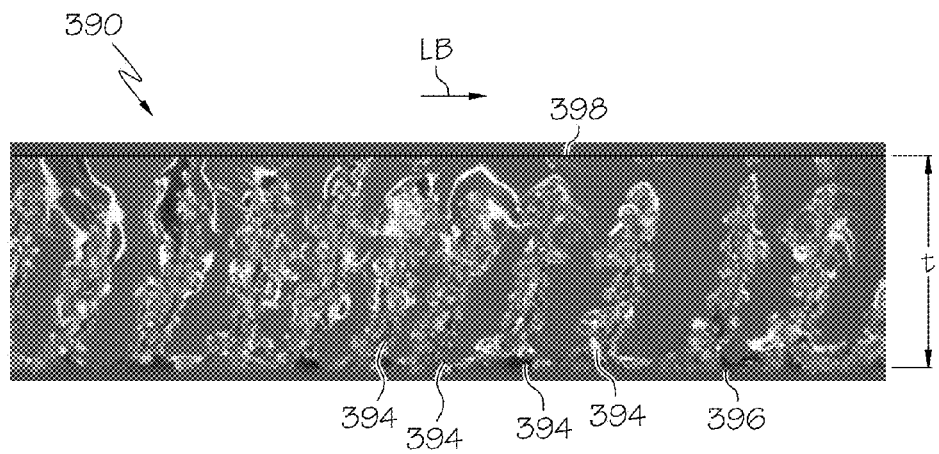
FIG. 9 is an image of an edge of an exemplary non-strengthened glass article separated from a glass article according to a method of cutting glass as shown or described herein.

Referring to FIG. 9, a non-strengthened glass article 390 was processed according to the methods described hereinabove. A non-strengthened glass article 390 (having no central tension) having a thickness of 0.63 millimeters was positioned and secured below a laser generating a beam at 532 nanometers at a pulse frequency of 30 kilohertz. The center of the beam waist BW of the laser beam was positioned below the second surface 396 and outside of the glass article 390. The laser was translated relative to the glass sheet at a scoring speed of 300 millimeters/second (i.e., the translation speed of the laser). The laser created a plurality of defects 394 that extended from the second surface 396 of the glass article 390 and were located non-orthogonally to the first and second surfaces 398, 396 of the glass article 390. The defects 394 were biased toward the direction of the translated laser beam, as indicated by arrow LB. In general, the defects 394 extended through the thickness of the glass sheet. However, because the defects 394 were discretely positioned apart from one another, the glass article 390 maintained mechanical structural integrity to allow handling. The non-strengthened glass article 390 was separated by application of a bending moment.

Example 2

Figure 10:
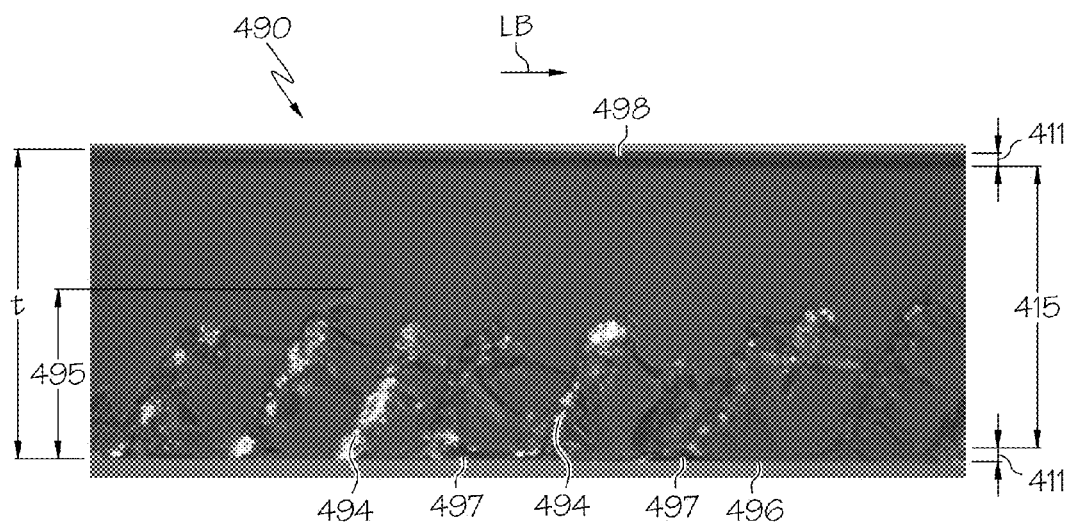
FIG. 10 is an image of an edge of an exemplary strengthened glass article separated from a glass article according to a method of cutting glass as shown or described herein.

FIG. 10 depicts a strengthened glass article 490 that was processed according to the methods described hereinabove. A strengthened glass article 490 having a thickness of 0.7 millimeters and a central tension of 45 megapascals was secured below a laser generating a beam at 532 nanometers and a pulse frequency of 80 kilohertz. The strengthened glass article 490 had a compressive surface layer 411 at the first and second surfaces 498, 496. The center of the beam waist BW of the laser beam was positioned below the second surface 496 and outside of the strengthened glass article 490. The laser was translated relative to the strengthened glass article 490 at a scoring speed of 950 millimeters per second. The laser created a plurality of defects 494 that extended from the second surface 496 of the strengthened glass article 490 and were located non-orthogonally to the first and second surfaces 498, 496 of the strengthened glass article 490. The defects 494 were biased toward the direction of the translated laser beam, as indicated by arrow LB. The defects 494 extended through the second compressive surface layer of the strengthened glass article 490. The defects 494 were terminated at a depth 495 inside the central tension region 415 of the strengthened glass article 490. Self-separation was observed. If self-separation did not occur for a relatively long period of time, then the strengthened glass sheet was separated in a subsequent, non-bending separation process by applying a pulling force to the scored parts from both sides of the score line in a glass plane perpendicular to the score line without bending).

Example 3

Figure 11:
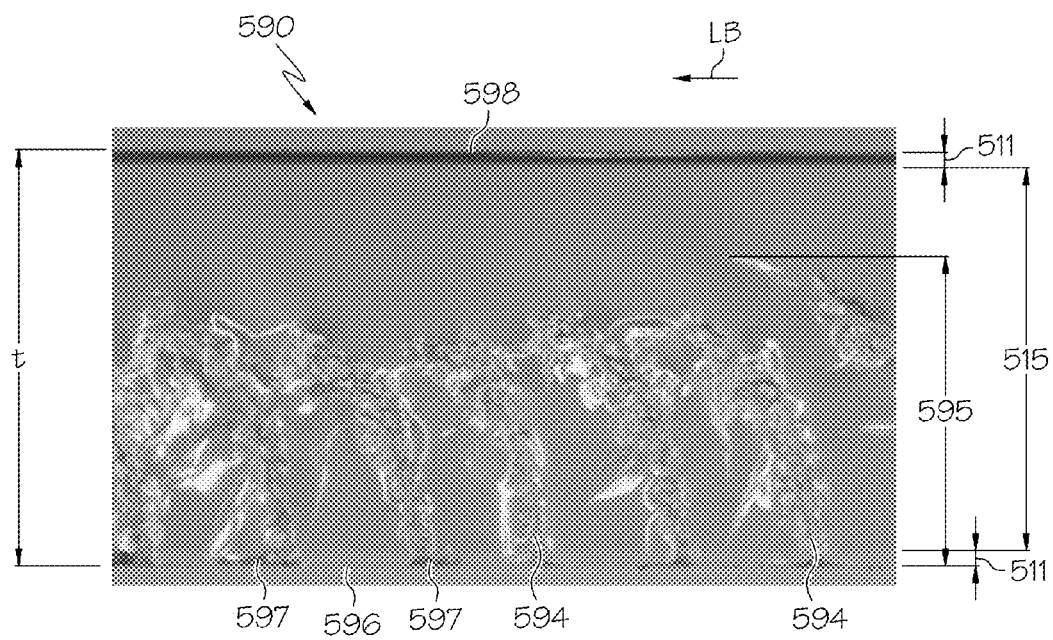
FIG. 11 is an image of an edge of an exemplary strengthened glass article separated from a glass article according to a method of cutting glass as shown or described herein.

FIG. 11 depicts a strengthened glass article 590 that was processed according to the methods described hereinabove. A strengthened glass article 590 having a thickness of 1.1 millimeters and a central tension of 29 megapascals was secured below a laser generating a beam at 532 nanometers and a pulse frequency of 80 kilohertz. The strengthened glass article 590 had a compressive surface layer 511 at the first and second surfaces 598, 596. The center of the beam waist BW of the laser beam was positioned below the second surface 596 and outside of the strengthened glass article 590. The laser was translated relative to the strengthened glass article 590 at a scoring speed of 800 millimeters per second. The laser created a plurality of defects 594 that extended from the second surface 596 of the strengthened glass article 590 and were located non-orthogonally to the first and second surfaces 598, 596 of the strengthened glass article 590. The defects 594 were biased toward the direction of the translated laser beam, as indicated by arrow LB. The defects 594 extended through the second compressive surface layer of the strengthened glass article 590. The defects 594 were terminated at a depth 595 inside the central tension region 515 of the strengthened glass article 590. Due to the lower central tension in the strengthened glass article 590 than the central tension in Example 2 and due to a lower scoring speed (800 millimeters per second vs. 950 millimeters per second) than the scoring speed in Example 2, the defects extended deeper into the central tension region 515. No self-separation was observed. The strengthened glass sheet was separated in a subsequent, non-bending separation process.

Example 4

Figure 12A:
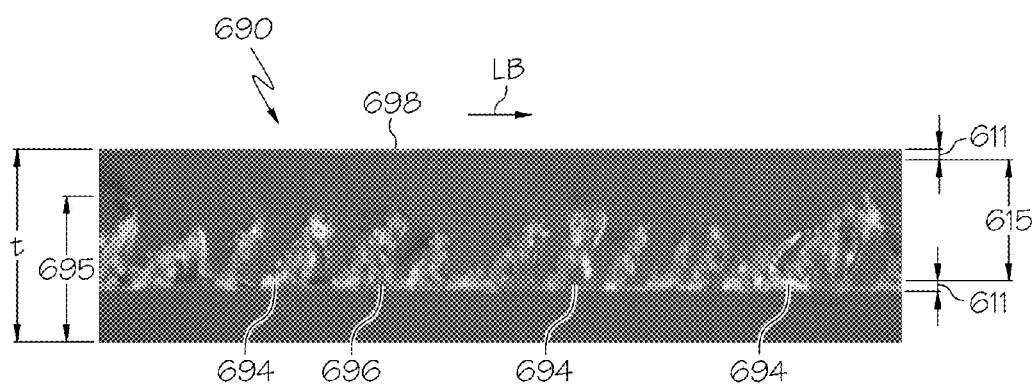
FIGS. 12A, 12B and 12C are images of an edge of exemplary strengthened separated glass articles separated from a glass article by a translating a laser beam relative to the glass article at 875 mm/s, 950 mm/s and 1000 mm/s, respectively, according to a method of cutting glass as shown or described herein.
Figure 12B:
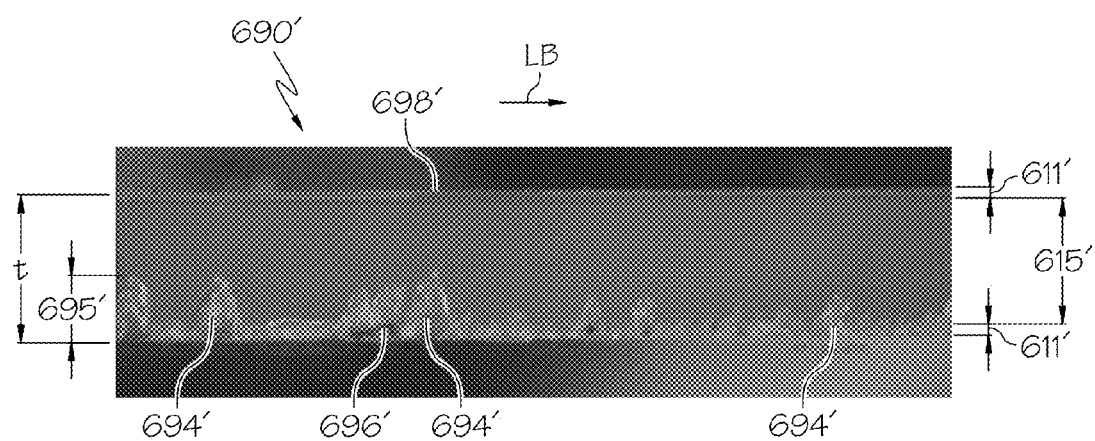
Figure 12C:
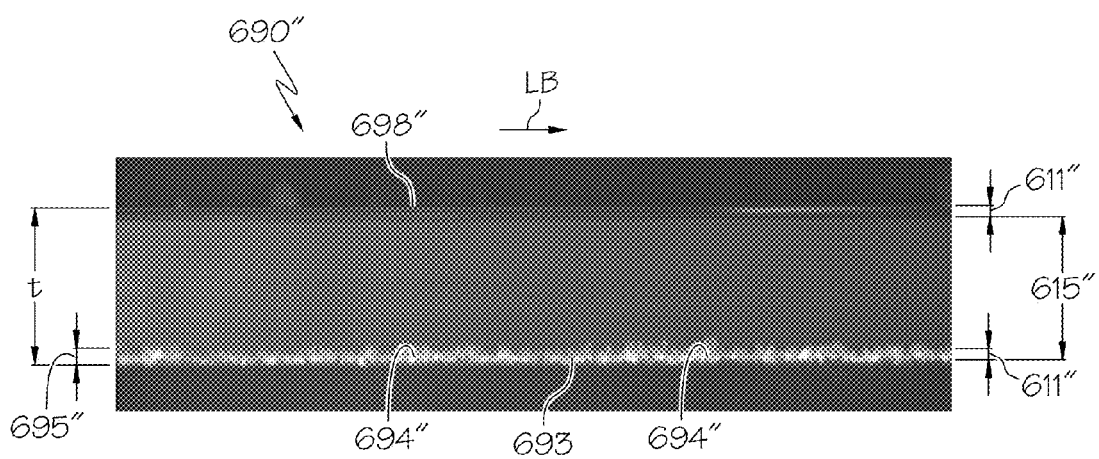

Referring now to FIGS. 12A-12C, strengthened glass sheets 690, 690', and 690" were processed according to the methods described hereinabove. The strengthened glass sheets 690, 690', and 690" had a thickness of 0.55 millimeters, a depth of compressive surface layer 611 of about 40 micrometers, and a central tension region 615 having a central tension from about 55 megapascals to about 60 megapascals. The strengthened glass sheets 690, 690', and 690" were secured below a laser generating a beam at 532 nanometers, a pulse frequency of 60 kilohertz and a power of 6 W. The center of the beam waist BW of the laser beam was positioned below the second surface 696, 696', 696" and outside of the strengthened glass sheets 690, 690', and 690".

Referring specifically to FIG. 12A, the laser was translated relative to the strengthened glass article 690 at a scoring speed of 875 millimeters per second. The laser created a plurality of defects 694 that extended from the second surface 696 of the strengthened glass article 690 and were located non-orthogonally to the first and second surfaces 698, 696 of the strengthened glass article 690. The defects 694 were biased toward the direction of the translated laser beam, as indicated by arrow LB. At the scoring speed of 875 millimeters per second, the plurality of defects 694 extended through the second compressive surface layer 611 of the strengthened glass article 690 to a depth 695 approximately in the center of the strengthened glass article 690.

Referring now to FIG. 12B, the laser was translated relative to the strengthened glass article 690' at a scoring speed of 950 millimeters per second. The laser created a plurality of defects 694' that extended from the second surface 696' of the strengthened glass article 690' and were oriented non-orthogonally to the first and second surfaces 698', 696' of the strengthened glass article 690'. The defects 694' were biased toward the direction of the translated laser beam, as indicated by arrow LB. As can be seen, some of the plurality defects 694' were oriented orthogonally with respect to the first and second surface 698', 696' of the strengthened glass article 690'. At the scoring speed of 950 millimeters per second, the defects 694' extended through the second compressive surface layer 611' of the strengthened glass article 690' to a depth 695' less than the center of the strengthened glass article 690'. It is noted that the depth 695' of the plurality of defects 694' resulting from a scoring speed of 950 millimeters per second was less than the depth 695 of the plurality of defects 694 resulting from a scoring speed of 875 millimeters per second.

Referring now to FIG. 12C, the laser was translated relative to the strengthened glass article 690" at a scoring speed of 1000 millimeters per second. The laser created a shallow vent 693, comprising a plurality of both orthogonal and non-orthogonal defects, that was slightly deeper than the second compressive surface layer 611". The shallow vent 693 was defined by defects 694" that were biased in the direction of the translated laser beam, as indicated by arrow LB. At the scoring speed of 1000 millimeters per second, the defects 694" do not extend significantly beyond the second compressive surface layer 611", into the central tension region 615". The shallow vent within the second compressive surface layer 611" may avoid premature self-separation, and improve edge quality. The process parameters may be optimized to have minimum vent depth to minimize the size of the edge defects, but at the same time to enable consistent self-separation within reasonable period of time after scoring, or externally induced separation by non-bending method. In the present example, self-separation was observed due to the higher level of central tension inside the glass. If self-separation did not occur for relatively long period of time, then the glass article was separated in a subsequent, non-bending separation process. It is noted that, in some embodiments, separation of the strengthened glass article may be accelerated by placing the scored strengthened glass article, or by spraying the scored strengthened glass article with water.

It should now be understood that nanosecond lasers having high beam quality are used to form a plurality of defects that extend from second surfaces of a glass article. The center of the beam waist of the laser beam may be positioned at or below the second surfaces of the glass article. The laser beam is translated relative to the glass article to cause defects to grow such that the defects are non-orthogonal to the first and second surfaces of the glass article and are biased in the direction of traversal of the laser. In some embodiments, the scoring process may allow the scored glass article to retain mechanical strength for handling and separating at a later operation. The scoring process may allow the scored glass article to self-separate into a plurality of portions of glass at a time after the score time. Lasers used in the process hereinabove may provide a beam within the visible spectrum that has photon energy of at least 2 eV.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of scoring a glass article comprising:
    translating a laser beam relative to a first surface of the glass article, the laser beam comprising a beam waist having a center, wherein:
    the center of the beam waist of the laser beam is positioned at or below a second surface of the glass article such that the laser beam passes through a thickness of the glass article;
    the laser beam operates at a wavelength from 350 nanometers to 619 nanometers and has a pulse duration from about 1 nanosecond to about 50 nanoseconds;
    the laser beam creates a plurality of defects in the form of voids or cracks along a score line in the glass article such that the plurality of defects extends a distance into the glass article from the second surface; and
    at least some individual defects of the plurality of defects are non-orthogonal to the first surface of the glass article and are biased in a direction of translation of the laser beam
    wherein the glass article is an ion-exchanged glass article having a first strengthened surface layer and a second strengthened surface layer under a compressive stress and extending from a surface of the ion-exchanged glass article to a depth of layer, and a central region between the first strengthened surface layer and the second strengthened surface layer that is under tensile stress, and the plurality of defects extends a distance greater than the depth of layer.

2. The method of claim 1, wherein the laser beam is oriented orthogonally to the first surface of the glass article.

3. The method of claim 1, wherein the laser beam is translated relative to the glass article at a speed S greater than about 20 millimeters per second.

4. The method of claim 1, wherein the laser beam is translated relative to the glass article at a speed S greater than about 200 millimeters per second.

5. The method of claim 1, wherein the central region has a tensile stress between about 20 and about 30 megapascals, and the plurality of defects extends through about half of the thickness of the ion-exchanged glass article.

6. The method of claim 1, wherein the central region has a tensile stress greater than about 40 megapascals, and a majority of a length of the plurality of defects is within the first or second strengthened layer.

7. The method of claim 1, wherein the plurality of defects creates a crack that propagates within the glass article such that the glass article separates along the score line into one or more separated glass articles.

8. The method of claim 7, further comprising finishing one or more edges of the one or more separated glass articles such that the one or more edges have a surface roughness below about 100 μm root mean squared.

9. A method of separating an ion-exchanged glass article comprising:
    translating a laser beam relative to a first surface of the ion-exchanged glass article, the laser beam comprising a beam waist having a center, wherein:
    the ion-exchanged glass article comprises a first strengthened surface layer and a second strengthened surface layer under a compressive stress and extending from a surface of the ion-exchanged glass article to a depth of layer, and a central region between the first strengthened surface layer and the second strengthened surface layer that is under tensile stress;
    the center of the beam waist of the laser beam is positioned at or below a second surface of the ion-exchanged glass article such that the laser beam passes through a thickness of the ion-exchanged glass article;
    the laser beam operates at a wavelength from 350 nanometers to 619 nanometers and has a pulse duration from about 1 nanosecond to about 50 nanoseconds;
    the laser beam ablates the second surface of the ion-exchanged glass article to create a plurality of defects in the form of voids or cracks that extend from ablated regions on the second surface of the ion-exchanged glass article;
    the plurality of defects defines one or more score lines along the ion-exchanged glass article;
    at least some individual defects of the plurality of defects are non-orthogonal to the first surface of the ion-exchanged glass article and are biased in a direction of translation of the laser beam;
    at least a portion of the plurality of defects extends a distance greater than the depth of layer of the ion-exchanged glass article; and
    the plurality of defects creates a crack that propagates within the ion-exchanged glass article such that the ion-exchanged glass article separates along the one or more score lines.

10. The method of claim 9, wherein the crack does not propagate ahead of the laser beam in a direction of translation of the laser beam.

11. The method of claim 9, wherein individual defects of the plurality of defects are discrete with respect to one another prior to separation of the ion-exchanged glass article.

12. The method of claim 1, wherein the plurality of defects extends into the distance of the glass article without changing a vertical position of the beam waist.

* * * * *

UNITED STATES PATENT AND TRADEMARK OFFICE
CERTIFICATE OF CORRECTION

PATENT NO. : 9,938,180 B2
APPLICATION NO. : 13/836717
DATED : April 10, 2018
INVENTOR(S) : Anatoli Anatolyevich Abramov et al.

Page 1 of 1

It is certified that error appears in the above-identified patent and that said Letters Patent is hereby corrected as shown below:

In the Claims

In Column 18, Line 7, Claim 5, delete "1 ," and insert -- 1, --, therefor.

Signed and Sealed this
Fifth Day of November, 2019

Andrei Iancu
*Director of the United States Patent and Trademark Office*